United States Patent

[11] 3,599,043

[72] Inventor  Siegfried Biedermann
              Schellenberg, Liechtenstein
[21] Appl. No. 784,652
[22] Filed     Dec. 18, 1968
[45] Patented  Aug. 10, 1971
[73] Assignee  Uninorm Anstalt
              Vaduz, Liechtenstein
[32] Priority  Dec. 19, 1967
[33]           Austria
[31]           A 11483/67

[54] ELECTRICAL CIRCUIT BREAKERS
     2 Claims, 1 Drawing Fig.
[52] U.S. Cl. .................................................. 317/18,
                                                              317/41
[51] Int. Cl. ................................................. H02h 1/02
[50] Field of Search ..................................... 317/18, 41,
                                         36, 28, 27, 155.5; 336/179

[56]              References Cited
              UNITED STATES PATENTS
1,325,048  12/1919  Simon .......................... 335/157
3,223,890  12/1965  Maul et al. ..................... 317/15
1,858,265   5/1932  Dahlstrom ..................... 317/41
3,427,505   2/1969  Biedermann .................. 317/41 X Primary Examiner—J. D. Miller
Assistant Examiner—Harry E. Moose, Jr.
Attorney—Ernest G. Montague ABSTRACT: A fault current protection switch with additional excess current release, which comprises a first coil to be energized by a fault current and a second coil of a magnet release separated from the first coil, the second coil serves the release upon occurrence of excess current. A one-phase current changer constitutes the sole means for energizing the second coil, and includes a voltage coil connected with the second coil. A resistance has a positive resistance coefficient and is disposed parallel to the voltage coil.

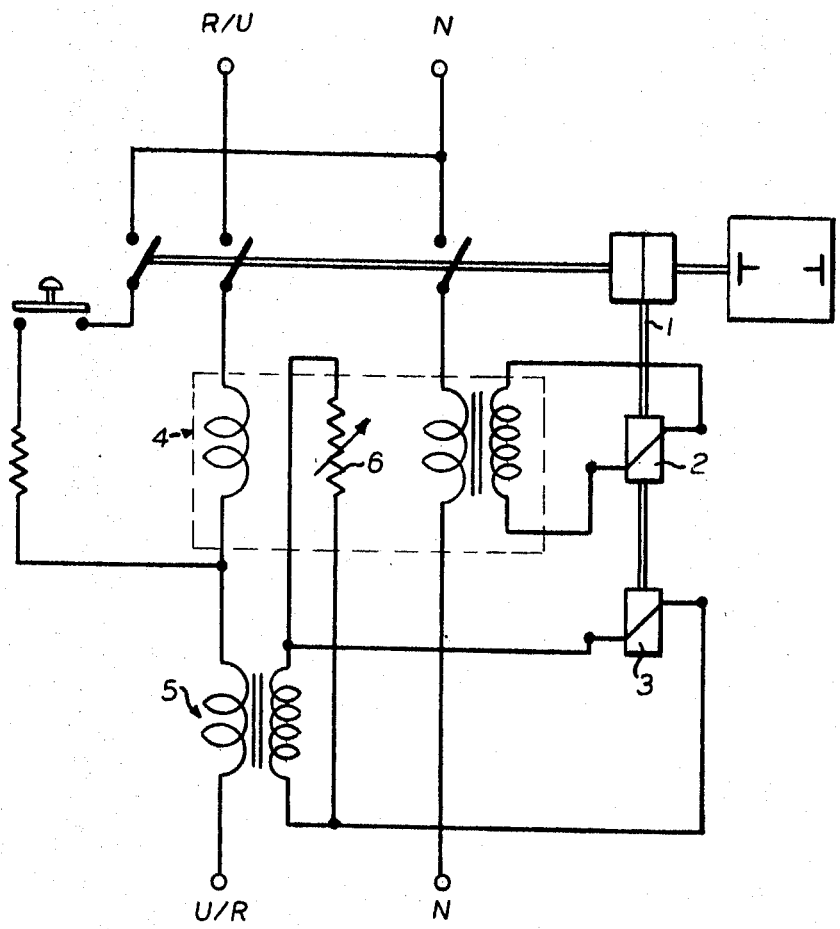

ELECTRICAL CIRCUIT BREAKERS

The present invention relates to a fault current protection switch with additional excess current release, providing a first winding and coil, respectively, excited by a fault current and a separate second winding and coil, respectively, of a magnet release excited by the first winding, whereby the second winding serves the excess current release.

Fault current protection switches for distributing systems have been construed until now mainly as load-limiting switches, which exercise merely a protective function against nonpermissible ground leakage currents.

Yet a strong demand for such switches with additional excess current protective functions exists in the industry. On the one hand, the latter makes possible a smaller dimension for the protection switch to its rated current (and not to the test current of an included fuse of equal rated current), and on the other hand, it improves the protective characteristics of the switch by removing the need for reliance upon and the fitting of the fuses.

In accordance with the present status of the prior art, the type of switch is considered as ideal, which combines cross voltage protection, in accordance with the fault current protection, with overload and short circuit protection.

If fault current protection switches are equipped with additional excess current release, a saving of an additional, automatic line protector is obtained.

In addition to the known releases with thermobimetals and speed release coils, a fault current protection switch with additional excess current release is known (Austrian Pat. No. 259,054), in which a resistance having a negative temperature coefficient (NTC-resistance) is disposed in the circuit of a second coil galvanically completely separated from the first, fault current excited coil of the magnet release, preferably designed as a holding magnet, which circuit is fed by means of current transformers in phase conductors from a voltage, which is thus a function of the currents flowing in the phase conductors.

In accordance with a further development, the second release coil is excited by a (correctly poled) direct current by means of a star grouping of three current transformers, three phase current rectifiers and a smoothing condenser, which is disposed parallel to the series connection of the NTC-resistance and the second release coil, and between the neutral points of the three secondary coils of the current transformers and the three phase current rectifiers.

In order to equip, however, also double-pole switch with an additional excess current release, it is required, to operate with a possibly smallest system.

It is thus one object of the present invention to provide a fault current protection switch with additional excess current release, wherein, for excitement of the second coil, a single-phase current transformer is provided only, the voltage winding of which is connected with the second coil, whereby a resistance having a positive temperature coefficient (PTC-resistance) is disposed parallel to the voltage winding.

Thus the fault current protection switch according to the present invention does not operate with a three-phase transformer, a three-phase half-wave rectifier and a smoothing condenser, rather has instead merely a one-phase current transformer and a PTC-resistance.

Suitably, the resistance having a positive temperature coefficient is disposed within the current transformer serving the fault current release.

With this and other objects in view which will become apparent in the following detailed description, the present invention, disclosed by example only, will be clearly understood in connection with the accompanying drawing, in which the only FIGURE is a circuit diagram depicting the present invention.

Referring now to the drawing, the switch comprises a release or tripping device 1 which has two separate windings and coils 2, 3, respectively, whereby the coil 2 is operatively connected with the voltage winding of the current transformer 4 and the coil 3 with the voltage coil of a single-phase current transformer 5.

Upon occurrence of excess current, a secondary voltage is produced in the transformer 5, which secondary voltage is at first insufficient, to release the release device 1 by means of the coil 3, since a PTC-resistance 6, which is very low ohmic in its cold state, is connected across the voltage coil of the transformer 5.

During the flow of excess current, however, the PTC-resistance 6 is heated up, whereupon its resistance increases, until finally the excitement of the coil 3 suffices, to operate the release device 1. Due to the parallel arrangement of the PTC-resistance 6, a time-retarded release takes place.

Upon occurrence of a short circuit, such high secondary voltage is created, since the current amounts in this case to a multiple of the rated current, that the coil 3 is sufficiently excited in spite of the cold or low ohmic resistance 6. By proper dimensioning an excess current release characteristic can be achieved by this switching arrangement, which characteristic corresponds with the L-type, as well as with the HL-type of the protection switch requirements.

While I have disclosed one embodiment of the present invention, it is to be understood that this embodiment is given by example only and not in a limiting sense.

I claim:

1. A fault current protection switch with additional excess current release, comprising
   a first coil to be energized by a fault current,
   a second coil of a magnet release separated from said first coil, said second coil serving the release upon occurrence of excess current,
   a single-phase current transformer constituting the sole means for energizing said second coil, and including a voltage coil connected with said second coil, and
   a resistance having a positive temperature coefficient and connected in parallel with said voltage coil.

2. The fault current protection switch, as set forth in claim 1, which includes
   a second current transformer serving the fault current release, and
   said resistance is disposed within said second current transformer.